Patented Jan. 3, 1933

1,893,155

UNITED STATES PATENT OFFICE

OWEN G. BENNETT, OF BALTIMORE, MARYLAND, ASSIGNOR TO CATALYST RESEARCH CORPORATION, OF BALTIMORE, MARYLAND, A CORPORATION OF MARYLAND

HYDROGENATION PROCESS AND CATALYST THEREFOR

No Drawing. Application filed June 18, 1932. Serial No. 618,023.

This invention relates to liquid phase catalytic hydrogenation.

It is among the objects of the invention to improve catalytic hydrogenation processes, especially in the liquid phase, particularly by providing improved supported nickel catalysts which may be made easily and cheaply, and in a state of exceptionally high activity, and thus to eliminate or minimize disadvantages heretofore present in this art.

A special object of the invention is to improve oil hydrogenation processes, and to provide particularly satisfactory catalysts therefor.

The invention is predicated upon my discovery that particularly satisfactory catalysts for liquid phase hydrogenation are provided by the reduction product of what are termed herein nickel chromites. I have found that such catalysts, which apparently comprise catalytic nickel supported on chromium oxide, and when made in the manner alluded to, are characterized by properties which render them especially suitable in place of the catalysts used heretofore for effecting hydrogenation in the liquid phase. It is predicated further upon my discovery of a method for preparing such catalysts in a state of exceptionally high activity.

In the practice of the invention, a suitable nickel chromite is reduced at an elevated temperature with a gaseous reducing agent, advantageously hydrogen, and the reduction product thus formed constitutes a hydrogenation catalyst which is added to a body of liquid, e. g. oil, to be hydrogenated, hydrogenation then being effected under appropriate conditions, by any suitable procedure. Most advantageously the chromites used are prepared by simple heating of nickel chromates.

Nickel chromates may be made in various ways, for example by reaction of solutions of nickel salts with solutions of chromic acid or soluble dichromates, to provide solutions of nickel chromates. Upon evaporating the solution to dryness the residual chromate may be heated further to convert it to chromite. Chromites formed from these and other chromates prepared by solution procedures may be reduced to provide reduction products capable of effecting catalytic hydrogenation of liquids, e. g. oils and other liquids capable of being hydrogenated.

According to my tests, the degree of catalytic activity of the final product may vary according to the manner of producing the initial chromate. An important feature of the invention resides in my discovery that chromates precipitated from solution are especially suitable for preparing the catalysts, and that exceptionally high activity is conferred by the use of precipitated nickel ammonium chromates. The precipitated chromates appear to be in a physical condition which favors higher activity than if made by simple solution methods, and this activity is enhanced apparently by the driving off of ammonia in converting the chromate to chromite.

One such chromate may be made by reaction of 2 mols of ammonium chromate and 1 mol of nickelous nitrate in cold aqueous solution. This produces a yellowish-green crystalline precipitate having substantially the empirical formula $Ni(NH_4)_2(CrO_4)_2$, and which upon being heated loses oxygen and ammonia and is converted to $NiCr_2O_4$. On reduction this yields an active catalytic product. A product of much greater, and usually high, activity is obtained, however, from precipitated chromate of the empirical formula $Ni_2O(NH_4)_2(CrO_4)_2$, which is converted by heat to the chromite $Ni_2Cr_2O_5$. It will be observed that in the latter compound the nickel-chromium ratio is 1:1. This is desirable in the practice of the invention as it affords a higher proportion of catalytic nickel per unit weight of $Cr_2O_3$ support than is obtained on reduction of 1Ni—2Cr chromites.

The nickel chromates are preferably made by reaction of compounds which leave no non-volatile impurity. This avoids the need for washing of the chromate to remove impurities,—a tedious procedure which at best may leave impurities which diminish the activity or decrease the life of the catalyst. The chromate is dried and then heated in air to convert it to chromite, e. g. by heating to 300° C. An important advantage of the precipitation procedures is that the precipitated chromate is separated from mother liquor and dried without washing. Thereafter the chromite is reduced in hydrogen while heating to 500° C., for example.

The substances subjected to reduction are referred to as chromites because all indications point to such structure. For example, they are formed by abstraction of a portion of the oxygen content of chromates. That they are not oxide mixtures, but are compounds, has been shown by X-ray analysis of the supposed chromites made by heating chromates prepared by various solution and precipitation methods. All of them gave identical X-ray patterns, and those patterns were characteristically and radically different from the X-ray pattern obtained with a mechanical mixture of oxides of nickel and chromium in chromite proportions. Thus whether or not the substances actually are chromites they may be so designated for brevity of identification and reference.

As illustrative of the preferred practice of the invention there may be cited the preparation of the exceptionally active catalyst referred to hereinabove. The chromate is made most satisfactorily by forming a very concentrated solution of a nickel salt, preferably the nitrate, and of chromic acid, and adding concentrated ammonium hydroxide thereto while stirring rapidly. A very fine brick red precipitate results, having the composition $Ni_2O(NH_4)_2(CrO_4)_2$. As a specific example, 290.8 grams (1 mol) of nickelous nitrate and 100 grams (1 mol) of chromic anhydride are dissolved in 300 cc. of water, and to the solution there is added about 200 cc. (3 mols) of commercial ammonium hydroxide. Ammonium chromate and nickel nitrate may be used in suitable proportions to form the same substance, but the solubility of ammonium chromate is such that concentrated solutions cannot be used, and as a result the physical character of the resultant precipitate is different from that obtained by the foregoing procedure, and the final product is of somewhat less activity.

The precipitate is filtered from the mother liquor, dried at 100° C., and heated to 300° or 350° C. In so heating the compound there is liberated a large amount of gases, causing the chromate to be decomposed to chromite. This gas evolution is especially great with the ammonium salts, and appears to assist in producing a catalyst of fine particle size and high activity. Reduction of the chromite is preferably carried on by heating it slowly up to about 500° C. while passing a slow stream of hydrogen over it in a suitable container. The chromite is not always completely reduced by heating to 500° C., because further amounts of water can be detected in the effluent gases if the temperature is raised to 550 or 600° C. However, the most active product is obtained, in general, by stopping the reduction at about 500° C. If completely reduced, the product consists of nickel intimately associated with chromic oxide, while that of the incomplete reduction is similar but includes also some amount of unreduced chromite. This chromite is not reduced in oil, so that it presumably remains as such in the catalyst during use.

The reduced catalyst is preserved in a non-oxidizing atmosphere until it is to be used, for example by sealing it in the reduction container, or by submerging it in a protective liquid, most suitably that with which it is to be used, such as oil. In effecting hydrogenation the catalyst is added in appropriate amount to the oil or other liquid to be treated, and hydrogen is passed into the suspension of catalyst thus formed. Factors such as hydrogen pressure, liquid temperature, rate of stirring, and duration of treatment will depend upon the particular liquid being hydrogenated and the degree of hydrogenation desired. These factors may be varied according to need, and are fully within the knowledge of the art.

The invention may be described further with reference to the hydrogenation of oils, to which it is especially applicable, and which is illustrative of liquid phase hydrogenation. As showing the exceptionally high activity evidenced by the catalysts, and the great improvement in liquid phase hydrogenation processes, provided by this invention, cotton seed oil having an iodine number of about 110 was hydrogenated with a catalyst comprising reduction product of $Ni_2O(NH_4)_2(CrO_4)_2$ in the manner described in detail hereinabove. Enough catalyst was added to the oil to provide 0.2175 percent of nickel. The oil, heated to 180° C. was stirred at high-speed, and hydrogen was passed into it at atmospheric pressure for thirty minutes. The iodine number of the treated oil was reduced to 28.9, an exceptionally low value. This and other tests which I have made indicate the exceptionally high activity of the catalysts provided by this invention and their ability to effect profound hydrogenation.

It thus appears that various procedural and practical benefits flow from the invention. The catalysts are made readily and easily, and by a simple procedure which directly provides a pure product and avoids the tedious washing and purifying operations heretofore commonly necessary. Also, it provides catalysts in which the nickel is not only exceedingly active, but also is supported intimately and adherently upon an inert carrier, and in a form of much finer particle size than has been commercially practicable previously. The carrier appears to have no injurious effect upon the activity at the temperatures used.

Moreover, the extreme activity of the catalysts is an important advantage. Thus it accelerates hydrogenation, so as to obtain an oil of a given degree of saturation in less time than formerly, and permits other desirable procedural changes. And the profound hydrogenating power provides for obtaining highly saturated products as well as those of lesser degrees of saturation, for example to give very hard products with the hardening oils. In other words, the catalysts are useful for obtaining almost any desired degree of hydrogenation. Also, the catalysts in general show long useful life.

Coupled with these factors is the added advantage that the catalysts may be regenerated readily after use. This may be accomplished by burning off the adherent oil, making an alkaline fusion to form nickel oxide and soluble chromate. The latter is dissolved out from the fusion residue, leaving the nickel oxide, which may be dissolved in acid. The chromium may be recovered from the chromate as chromic anhydride, and thus both materials are recovered for reuse to form fresh catalysts.

This application is a continuation in part of my copending application Serial No. 599,357, filed March 16, 1932.

According to the provisions of the patent statutes, I have explained the principle of my invention and have described what I now consider to represent its best embodiment. However, I desire to have it understood that, within the scope of the appended claims, the invention may be practiced otherwise than as specifically described.

I claim:

1. A process of hydrogenating unsaturated fatty oils, comprising passing hydrogen into a liquid body of the oil to be hydrogenated and having in suspension a catalyst composed of metallic nickel intimately associated with and adherently supported on chromium oxide and formed by reduction of a substance having substantially the empirical formula $Ni_2Cr_2O_5$.

2. A process of hydrogenating unsaturated fatty oils, comprising passing hydrogen into a liquid body of the oil to be hydrogenated and having in suspension a catalyst composed of metallic nickel intimately associated with and adherently supported on chromium oxide and formed by reduction of a nickel-chromite.

3. A process of hydrogenating unsaturated fatty oils, comprising passing hydrogen into a liquid body of the oil to be hydrogenated and having in suspension a catalyst composed of metallic nickel intimately associated with and adherently supported on chromium oxide and formed by reduction of a nickel chromium-oxygen compound corresponding empirically in composition to nickel chromite and having a nickel-chromium ratio of 1:1.

4. A process of hydrogenating unsaturated fatty oils, comprising passing hydrogen into a liquid body of the oil to be hydrogenated and having in suspension a catalyst composed of metallic nickel intimately associated with and adherently supported on chromium oxide and formed by heating nickel ammonium chromate to form nickel chromite, and then reducing said chromite prior to suspending the catalyst in said oil.

5. A process of hydrogenating unsaturated fatty oils, comprising passing hydrogen into a liquid body of the oil to be hydrogenated and having in suspension a catalyst composed of metallic nickel intimately associated with and adherently supported on chromium oxide and formed by heating a compound corresponding substantially to the empirical formula $Ni_2O(NH_4)_2(CrO_4)_2$ to form nickel chromite, and reducing said chromite with a gaseous reducing agent prior to suspending the catalyst in said oil.

6. A process according to claim 4, said oil being cottonseed oil.

7. A process according to claim 5, said oil being cottonseed oil.

8. The method of making a catalyst for hydrogenation of fatty oils in the liquid phase and composed of metallic nickel intimately associated with and adherently supported on chromium oxide, comprising reacting a water soluble nickel salt, a chromium compound of the group consisting of chromic acid and alkali metal chromates, and ammonia to thereby precipitate nickel ammonium chromate, heating said chromate to convert it to nickel chromite, and reducing said chromite at an elevated temperature with a gaseous reducing agent.

9. A method of making a catalyst for hydrogenation of unsaturated fatty oils in the liquid phase composed of metallic nickel intimately associated with and adherently supported on chromium oxide, comprising reacting, in concentrated solution, a water soluble nickel salt, chromic acid, and ammonia, in proportions adapted to precipitate a compound having substantially the formula $Ni_2O(NH_4)_2(CrO_4)_2$, heating said precipitate to about 350° C. to convert it to nickel chromite, and reducing said chromite in hydrogen at a temperature of about 500° C.

10. A method of making a catalyst for hydrogenation of unsaturated fatty oils in the liquid phase and composed of metallic nickel intimately associated with and adherently supported on chromium oxide, comprising reacting a water soluble nickel salt, ammonia, and a water soluble chromium compound capable of reacting with said nickel salt to form nickel chromate to thereby precipitate nickel ammonium chromate, heating said chromate up to about 350° C. to convert it to nickel chromite, and then reducing said chromite at an elevated temperature in the gaseous phase with hydrogen.

In testimony whereof, I sign my name.

OWEN G. BENNETT.